United States Patent
Pozzi et al.

(10) Patent No.: US 9,573,688 B2
(45) Date of Patent: Feb. 21, 2017

(54) AIRCRAFT SEAT BASE FRAME

(71) Applicant: B/E Aerospace, Inc., Wellington, FL (US)

(72) Inventors: Alexander Nicholas Pozzi, Winston-Salem, NC (US); Benjamin D. Stephens, Atlanta, GA (US); Mark A. Kruse, Atlanta, GA (US); Francis X. Garing, Atlanta, GA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/679,516

(22) Filed: Apr. 6, 2015

(65) Prior Publication Data

US 2015/0284095 A1    Oct. 8, 2015

Related U.S. Application Data

(60) Provisional application No. 61/975,144, filed on Apr. 4, 2014.

(51) Int. Cl.
  A47C 7/72     (2006.01)
  B64D 11/06    (2006.01)
  B64D 11/00    (2006.01)

(52) U.S. Cl.
  CPC ....... B64D 11/0648 (2014.12); B64D 11/0015 (2013.01); B64D 11/0631 (2014.12); B64D 11/0636 (2014.12)

(58) Field of Classification Search
  CPC ............. B64D 11/0631; B64D 11/0636; B64D 11/0648; B64D 11/0015
  USPC .......... 297/188.01, 188.08, 188.09, 188.1,297/188.11, 188.12, 188.13
  See application file for complete search history.

(56) References Cited

U.S. PATENT DOCUMENTS 3,603,638 A * 9/1971 McGregor ........... B60N 2/4221
                                              248/429
3,623,683 A * 11/1971 Bennett ................. B64D 11/00
                                           297/188.11 X
4,229,040 A * 10/1980 Howell .............. B64D 11/0648
                                              297/232
4,306,748 A * 12/1981 Sullivan ................... B63C 9/28
                                              297/188.1
4,489,978 A * 12/1984 Brennan ................ B60N 2/242
                                              244/118.6

(Continued)

FOREIGN PATENT DOCUMENTS

WO      2004026688 A1    4/2004
WO  WO 2004026688 A1 *  4/2004  ........ B64D 11/0015
WO      2013109751 A1    7/2013

OTHER PUBLICATIONS

International Search Report and Written Opinion of corresponding International Application No. PCT/US2015/024513; 10 pages; dated Aug. 3, 2015.

Primary Examiner — Rodney B White
(74) Attorney, Agent, or Firm — Oblon, McClelland, Maier & Neustadt, L.L.P.

(57) ABSTRACT

An aircraft passenger seat base frame including spaced left and right spreaders cooperatively supporting a seat bottom and a seatback, spaced front and rear transverse beams interconnecting the left and right spreaders, spaced left and right leg assemblies each including a front leg and a rear leg, an in-flight entertainment component position in a space below the seat bottom, and a life vest container positioned below a front end of the seat bottom.

15 Claims, 5 Drawing Sheets

(56) References Cited

U.S. PATENT DOCUMENTS

| | | | | |
|---|---|---|---|---|
| 4,911,381 A * | 3/1990 | Cannon | B64D 25/04 | 244/122 R |
| 5,183,313 A * | 2/1993 | Cunningham | B64D 11/0696 | 248/429 |
| 5,409,186 A * | 4/1995 | Chow | B64D 11/06 | 165/41 |
| 5,485,976 A * | 1/1996 | Creed | B64D 11/06 | 244/118.6 |
| 5,553,923 A * | 9/1996 | Bilezikjian | B64D 11/06 | 297/232 |
| 5,657,950 A * | 8/1997 | Han | B64D 11/06 | 244/122 R |
| 5,730,492 A * | 3/1998 | Warrick | B60N 2/4221 | 297/216.2 |
| 5,829,836 A * | 11/1998 | Schumacher | B64D 11/0693 | 297/188.1 X |
| 6,038,426 A * | 3/2000 | Williams, Jr. | B64D 11/0015 | 725/77 |
| 6,960,110 B2 * | 11/2005 | Hough | B63C 9/22 | 206/807 |
| 7,077,467 B2 * | 7/2006 | Wenzler | H02G 3/0487 | 297/188.08 X |
| 7,252,569 B2 * | 8/2007 | Everhart | B64D 11/06 | 297/188.08 X |
| 7,338,131 B2 * | 3/2008 | Forgatsch | B64D 11/06 | 297/188.08 |
| 7,517,014 B2 * | 4/2009 | Schroeder | B64D 11/06 | 297/188.09 X |
| 7,530,631 B2 * | 5/2009 | Skelly | B60N 2/62 | 297/188.08 |
| 7,926,873 B2 * | 4/2011 | Rombouts | B64D 11/0015 | 297/188.1 |
| 7,976,101 B2 * | 7/2011 | Wieland | B64D 11/06 | 297/188.08 |
| 8,002,350 B2 * | 8/2011 | Johnson | B60N 3/004 | 297/188.1 X |
| 8,128,163 B2 * | 3/2012 | Alberti | B60R 5/003 | 297/188.08 X |
| 8,292,224 B1 * | 10/2012 | Ahad | B64D 11/0696 | 244/118.6 |
| 8,496,291 B2 * | 7/2013 | Lamoree | B64D 11/06 | 297/188.08 X |
| 8,616,631 B2 * | 12/2013 | Westerink | B60N 2/24 | 297/188.08 |
| 2002/0175547 A1 * | 11/2002 | Bentley | B60N 2/22 | 297/316 |
| 2002/0175554 A1 * | 11/2002 | Cheng | B60N 2/44 | 297/463.1 |
| 2003/0054687 A1 | 3/2003 | Sanner et al. | | |
| 2003/0094837 A1 * | 5/2003 | Williamson | B60N 3/004 | 297/163 |
| 2003/0094838 A1 * | 5/2003 | Williamson | B60N 2/682 | 297/232 |
| 2003/0094840 A1 * | 5/2003 | Williamson | B64D 11/06 | 297/248 |
| 2003/0094842 A1 * | 5/2003 | Williamson | B60N 2/015 | 297/362.13 |
| 2004/0021349 A1 * | 2/2004 | Longtin | B60N 2/4606 | 297/217.3 |
| 2004/0046430 A1 * | 3/2004 | Plant | B60N 2/4606 | 297/248 |
| 2004/0066065 A1 * | 4/2004 | Forstner | B64D 11/06 | 297/188.08 |
| 2005/0062319 A1 * | 3/2005 | Hough | B63C 9/22 | 297/188.08 |
| 2006/0006704 A1 * | 1/2006 | Skelly | B60N 2/62 | 297/188.08 |
| 2006/0163917 A1 * | 7/2006 | Schroeder | B64D 11/06 | 297/188.1 |
| 2007/0228794 A1 * | 10/2007 | Penley | B60N 2/2236 | 297/354.1 |
| 2008/0106127 A1 * | 5/2008 | Hough | B64D 11/0629 | 297/188.08 |
| 2009/0058165 A1 * | 3/2009 | Rombouts | B64D 11/0015 | 297/452.18 |
| 2009/0302665 A1 * | 12/2009 | Dowty | B61D 33/0057 | 297/463.1 |
| 2012/0217779 A1 * | 8/2012 | Gaither | B60N 2/242 | 297/316 |
| 2013/0175831 A1 * | 7/2013 | Reh | B64D 11/06 | 297/188.01 X |
| 2014/0375090 A1 * | 12/2014 | Wegenka | B60N 2/242 | 297/188.09 |
| 2015/0091342 A1 * | 4/2015 | Cailleteau | B60N 2/0224 | 297/188.08 |
| 2015/0284087 A1 * | 10/2015 | Henshaw | B64D 11/064 | 297/318 |
| 2016/0009398 A1 * | 1/2016 | Klettke | B64D 11/0627 | 297/188.09 X |
| 2016/0023769 A1 * | 1/2016 | Zheng | B64D 11/0648 | 297/452.18 |
| 2016/0039523 A1 * | 2/2016 | Guttropf | B64D 11/003 | 297/188.08 |

* cited by examiner

AIRCRAFT SEAT BASE FRAME

CROSS-REFERENCE TO RELATED APPLICATION

This application claims priority from U.S. Application No. 61/975,144 filed Apr. 4, 2014, the entirety of which is incorporated by reference herein.

TECHNICAL FIELD AND BACKGROUND OF THE INVENTION

The present invention relates generally to an aircraft passenger seat frame arrangement, and more particularly, to a seat base frame layout for an aircraft passenger seat in which in-flight entertainment components are located over one of the front and rear beams, allowing a life-vest container to be positioned below or in front in an area with low passenger space impact.

Aircraft passenger seats are typically configured with in-flight entertainment ("IFE") equipment such as video, media, internet, communications and audio equipment for use during a flight. Such equipment often requires supporting hardware, cabling, wire harnesses, etc., referred to collectively herein as "IFE components," that must be located in proximity to the WE equipment. Because the area beneath the seat is typically reserved for legroom and luggage storage, particularly in economy seating classes, it has been necessary to locate IFE components apart from the seats that they serve, resulting in long cable lengths, complexity and cost. Therefore, it would be desirable to configure a seat frame such that it is possible and practical to locate IFE components beneath the seats, without having to relocate life vest containers or consuming space reserved for passenger use.

BRIEF SUMMARY OF THE INVENTION

It is therefore an object of the invention to provide an aircraft passenger seat base frame configured to position an in-flight entertainment component in a position apart and protected from passenger living space and luggage retention.

It is another object of the invention to provide an aircraft passenger seat base frame configured to position a life vest container containing a life vest in a position proximate a forward end of the seat bottom for ready access and out of the way of passenger living space and luggage retention.

It is a further object of the invention to provide an aircraft passenger seat base frame in which the transverse beam tubes are arranged to define spaced below the seat bottom for accommodating in-flight entertainment equipment and a life vest container.

It is a further object of the invention to provide space below an aircraft passenger seat bottom for positioning in-flight entertainment equipment that serves a single seat, laterally adjacent seats, a row of laterally adjacent seats, longitudinally adjacent seats, or rows of longitudinally adjacent seats.

It is a further object of the invention to provide and aircraft passenger seat base frame including particular transverse beam tube arrangements defining protected and dedicated space beneath the seat bottom for housing in-flight entertainment equipment and/or a life vest container containing a life vest.

To achieve the foregoing and other embodiments, in one embodiment the present invention provides an aircraft passenger seat base frame including spaced left and right spreaders supporting a seat bottom and a seatback, spaced front and rear transverse beams interconnecting the left and right spreaders, the front beam positioned proximate a forward end of the seat bottom and the rear beam positioned proximate a rear end of the seat bottom and at a vertical height lower than the front beam, an in-flight entertainment component positioned below the seat bottom in a space behind the front beam and vertically above the rear beam, and a life vest container positioned vertically below the front beam.

In another aspect, the seat base frame may include spaced left and right leg assemblies each including a front leg and a rear leg adapted to be secured to a seat track by way of track fasteners.

In another aspect, each leg assembly may include a front leg that extends vertically between the front beam and the seat track, and a rear leg that extends from vertically below the front beam to a position on the seat track behind the rear beam.

In another aspect, the seat base frame may include a shroud positioned vertically below the in-flight entertainment component.

In another aspect, the seat base frame may include a luggage retention bar positioned vertically below the life vest container.

In another aspect, the seat base frame may include a center spreader centered between the left and right spreaders, the center spreader shared by laterally adjacent passenger seats, and the front and rear transverse beams spanning between the left and right spreaders and through the center spreader.

In another aspect, the in-flight entertainment component may include one or more of video equipment, media equipment, internet equipment, communications equipment, audio equipment, cabling, and a wire harness.

In another embodiment, the present invention provides an aircraft passenger seat base frame including spaced left and right spreaders supporting a seat bottom and a seatback, spaced front and rear transverse beams interconnecting the left and right spreaders, the front beam positioned proximate a middle of the seat bottom and the rear beam positioned proximate a rear end of the seat bottom and at a vertical height above the front beam, an in-flight entertainment component positioned below the seat bottom in a space above the front beam and forward of the rear beam, and a life vest container positioned forward of the front beam and vertically below the in-flight entertainment component.

In another aspect, the seat base frame includes left and right leg assemblies each including a front leg and a rear leg adapted to be secured to a seat track by way of track fasteners.

In another aspect, the front legs may extend at an angle to vertical from the front beam to a position on the seat track forward of the front beam, and the rear legs may curve from vertically below the rear beam to a position on the seat track behind the rear beam.

In another aspect, the seat base frame may include a shroud positioned between the in-flight entertainment components and the life vest container, the life vest container secured to the underside of the shroud.

In another aspect, the seat base frame may include a luggage retention bar positioned vertically below the life vest container.

In another embodiment, the present invention provides an aircraft passenger seat base frame including spaced left and right spreaders cooperatively supporting a seat bottom and a seatback, spaced front and rear transverse beams interconnecting the left and right spreaders, spaced left and right leg assemblies each including a front leg and a rear leg, an in-flight entertainment component position in a space below the seat bottom, and a life vest container positioned below a front end of the seat bottom.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present, invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
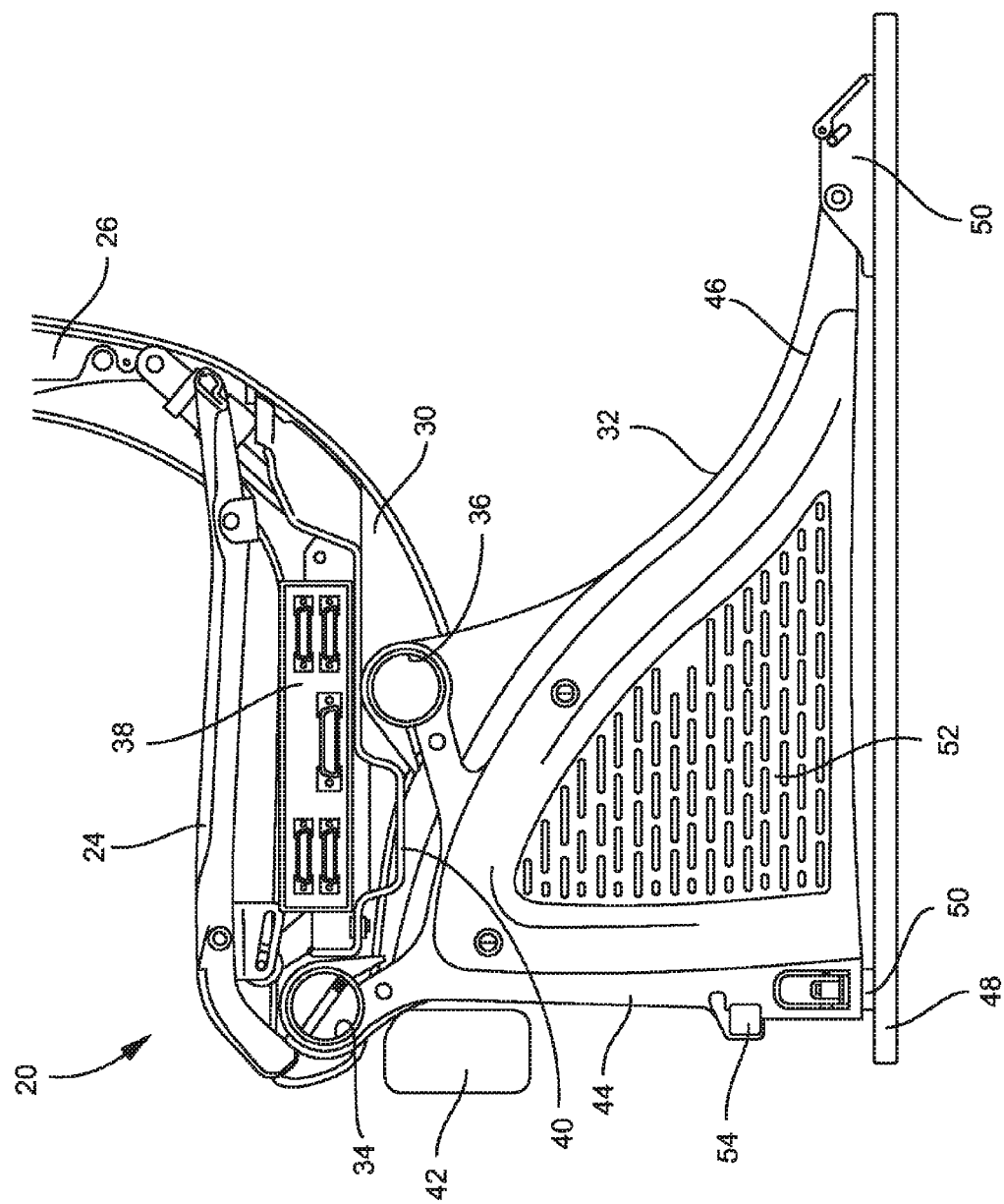
FIG. 1 is a side elevation view of an aircraft passenger seat base frame according to a first embodiment of the invention.
Figure 2:
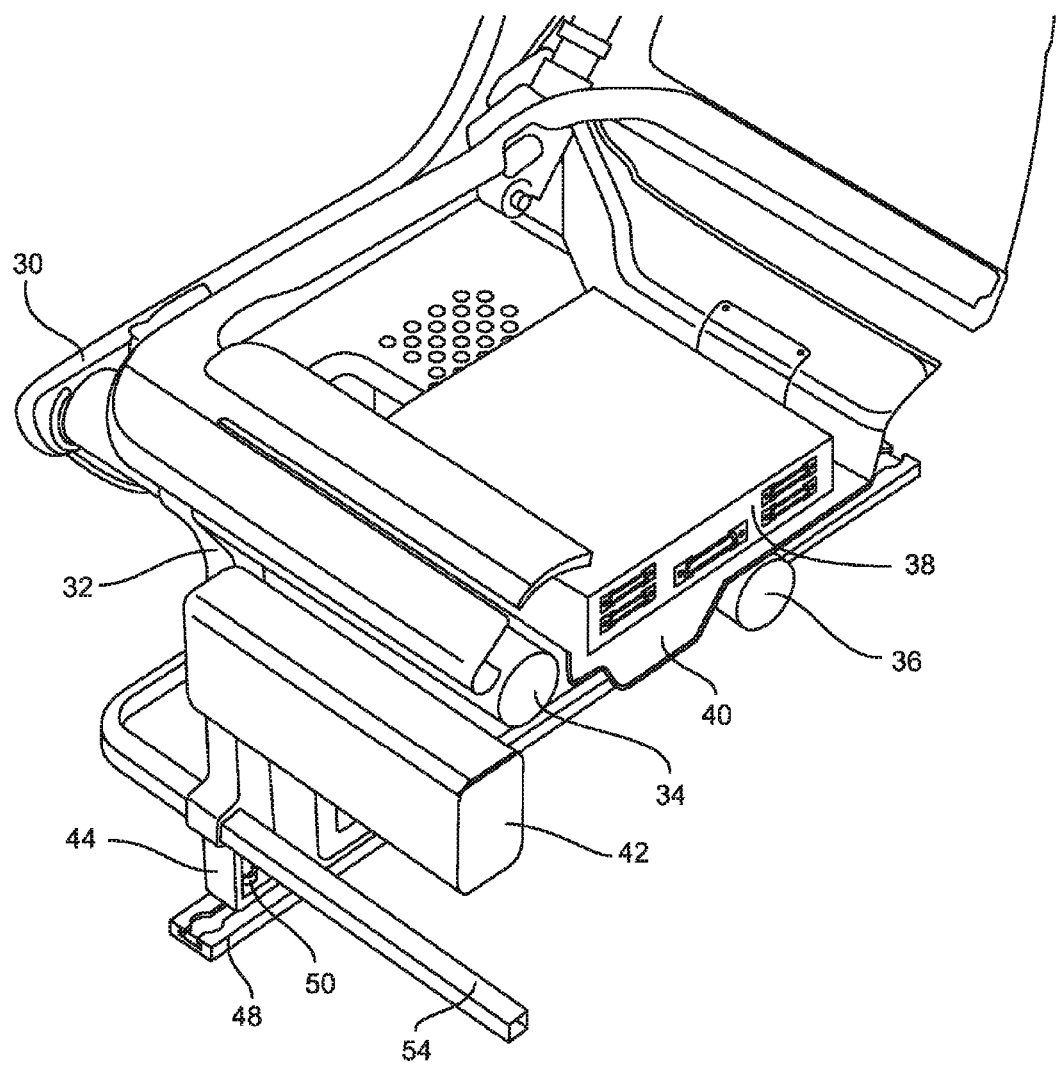
FIG. 2 is a top perspective view of the seat base frame of FIG. 1.
Figure 3:
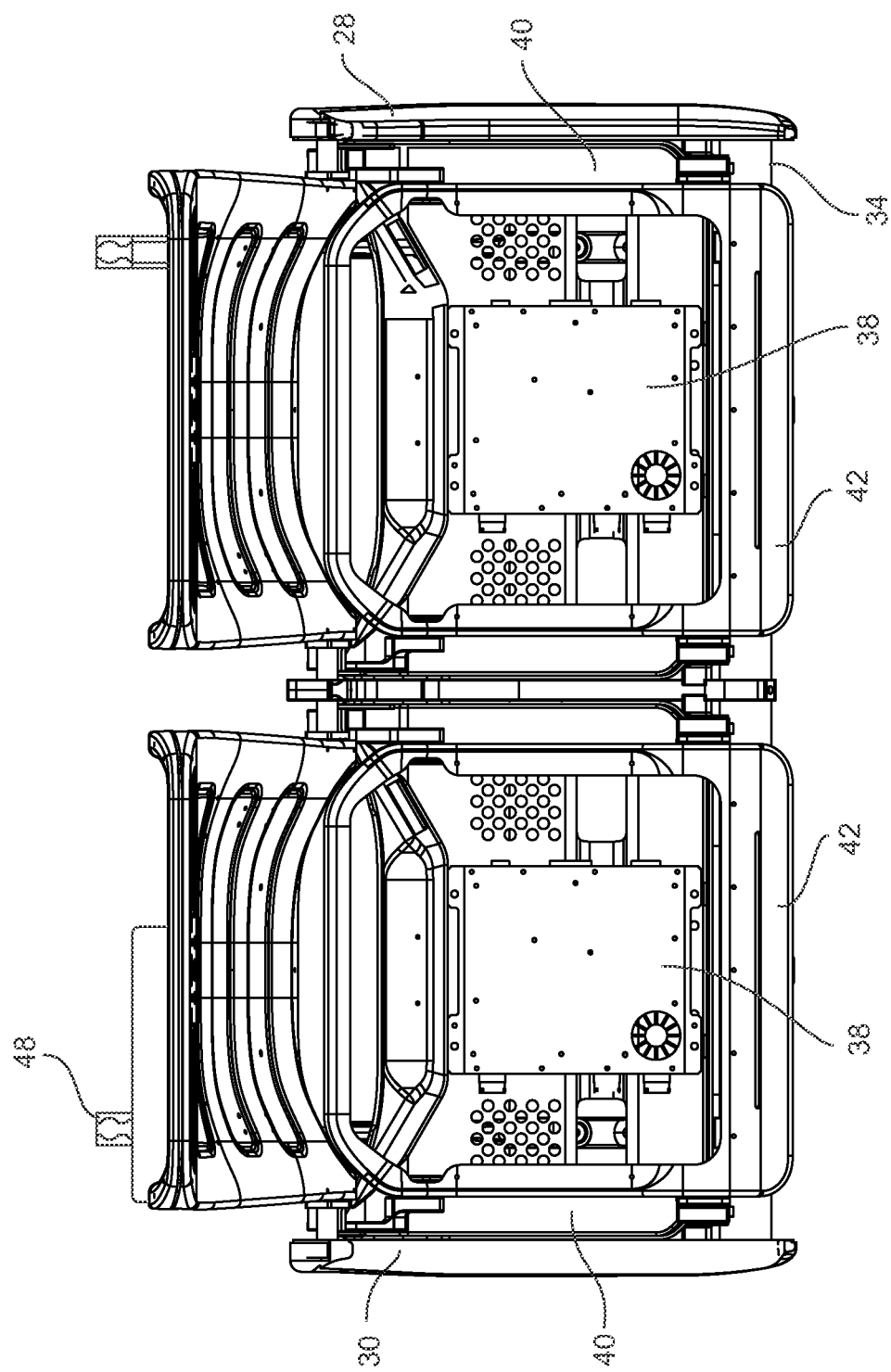
FIG. 3 is a top view of laterally adjacent seat base frames according to the embodiment of FIG. 1.

Referring to FIGS. 1-3, a first embodiment of an aircraft passenger seat base frame is shown generally at reference numeral 20. The seat base frame 20 may include a single seat, or two or more laterally adjacent seats collectively forming a seating group such as a row of seats. Each seat within the same row generally includes a seat bottom 24 and seatback 26 cooperatively supported on and between spaced left and right spreaders 28, 30. The left and right spreaders 28, 30, positioned on opposite sides of the seat bottom 24, are supported above the floor by spaced left and right leg assemblies 32. The left and right spreaders 28, 30 and leg assemblies 32 are interconnected through front and rear transverse beams 34, 36, such as transverse beam tubes as shown. Although not shown, each seat may include a leg rest and/or one or more arm rests. The seat bottom 24 and/or seatback 26 may adjust to achieve upright and reclined sitting positions for taxi, take-off and landing and comfort during flight, respectively. Seatback recline may be driven by seat bottom movement or independent thereof by way of pivotable attachment to the left and right spreaders 28, 30.

The left and right spreaders 28, 30 and front and rear beams 34, 36 are primary supportive frame members of the seat base frame 20, and as such, are positioned to the respective sides and bottom of the seat bottom 24. The front transverse beam or "front beam" 34 according to the first embodiment is positioned vertically below the seat bottom 24 proximate the front end thereof. The rear transverse beam or "rear beam" 36 is positioned proximate the back end of the seat bottom and a vertical height lower than the front beam 34. In this beam arrangement, a space is provided behind the front beam 34 and above the rear beam 36 for locating in-flight entertainment (IFE) components shown generally at reference numeral 38. IFE components may include, but are not limited to, video equipment, media equipment, internet equipment, communications equipment, audio equipment, cabling, and a wire harness.

The space dedicated for the IFE components 38 is protected from the front by the front beam 34, the top by the seat bottom 24, the rear by the rear beam 36, and the back by the seatback 26. The dedicated space for the IFE components 38 is spaced apart and protected from passenger living space and under seat space dedicated for luggage storage for an aft-seated passenger. Accessing the IFE components 38 may require removing the seat bottom 24 or shroud 40 positioned immediately below the IFE components. The shroud 40 provides a rigid, supportive and protective surface for seating the IFE components 38 thereon and protecting the IFE components from below, among other functions. The shroud may include IFE components attachment points and runs for routing associated cabling. The shroud 40 may be secured to the left and right spreaders 28, 30 and/or the front and rear beams 34, 36.

The IFE components 38 may serve a single seat, laterally adjacent seats, all seats within the same row, longitudinally adjacent seats, longitudinally adjacent rows of seats, seats across the aisle from one another, etc.

The front and rear beam arrangement frees space forward of the rear beam 36 and vertically below the front beam 34 for locating a life vest container 42 containing a life vest to be used in an emergency situation. Positioning the life container 42 in this location allows quick and easy access for the passenger, while also positioning the life vest container apart from the luggage storage area beneath the seat bottom 24. The life vest container 42 may be a generally rectangular-shaped container spanning a portion of the width of the seat bottom 24. The container may include a top flap, door or other opening for accessing the interior of the container to remove the life vest therefrom. The container 42 may be fixed to the seat base frame 20 or removably attached thereto so that the entire container 42 can be pulled from the seat and then opened. The location of the life vest container 42 has little or no passenger space impact.

The left and right leg assemblies 32 each include a front leg 44 and a rear leg 46 configured to attach to an underlying seat track 48 in the floor by way of conventional track fasteners 50. The front leg 44 as shown extends generally linearly and vertically between the front beam 34 and the floor, while the rear leg 46 is curved and extends from vertically below the front beam 34 to a position on the seat track 48 behind the rear beam 36, and as shown, substantially rearward of the rear beam. The space formed between the front and rear legs 44, 46, may be covered with a panel 52, for example, to divide footwells and/or prevent luggage stowed beneath the seat from moving into the aisle.

FIG. 2 is a perspective view of the seat base frame 20 showing the location of the IFE components 38 and life vest container 42 that allow the components to be packaged in areas that do not detriment or cannibalize passenger living space, as well as hide associated parts (e.g., fasteners, wire harness, etc.) from view and prevent access by the passengers. Additionally, the front beam 34 assists in protecting the IFE components 38 from load and impact. Also, locating the IFE components 38 in an area that does not vary between various primary seat base frame configurations, such as track spacing, obviates the need for a multitude of unique parts, and shrouds, fastening points and other related parts can be made common across all configurations.

A luggage retention bar 54 extends from a side of the seat base frame 20 and across the front the front legs 44 at a height elevated off of the underlying floor to retain luggage stowed beneath the seat by an aft-seated passenger from sliding forward into the foot space of the seated passenger. The luggage retention bar 54 may extend across the front of one single seat or across the front of an entire row of seats. The luggage retention bar 54 as shown is secured to the front of the front legs 44.

FIG. 3 shows laterally adjacent passenger seats within the same row sharing common frame elements such as the front and rear beams 34, 36, and a center spreader 56 centered between the left and right spreaders 28, 30. Each seat is shown having its own dedicated IFE components 38, although as discussed above, IFE components located within one seat may serve additional seats.

Figure 4:
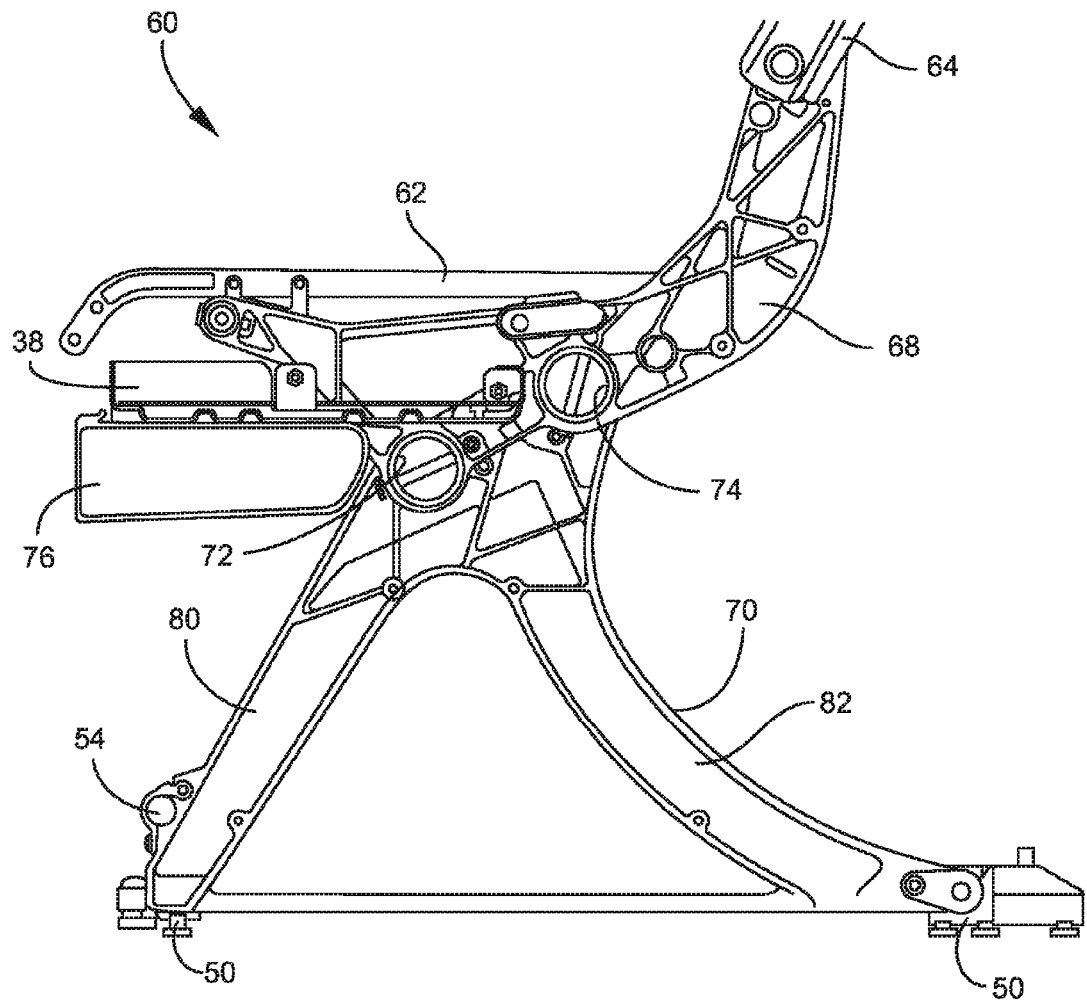
FIG. 4 is a side elevation view of an aircraft passenger seat base frame according to a second embodiment of the invention.
Figure 5:
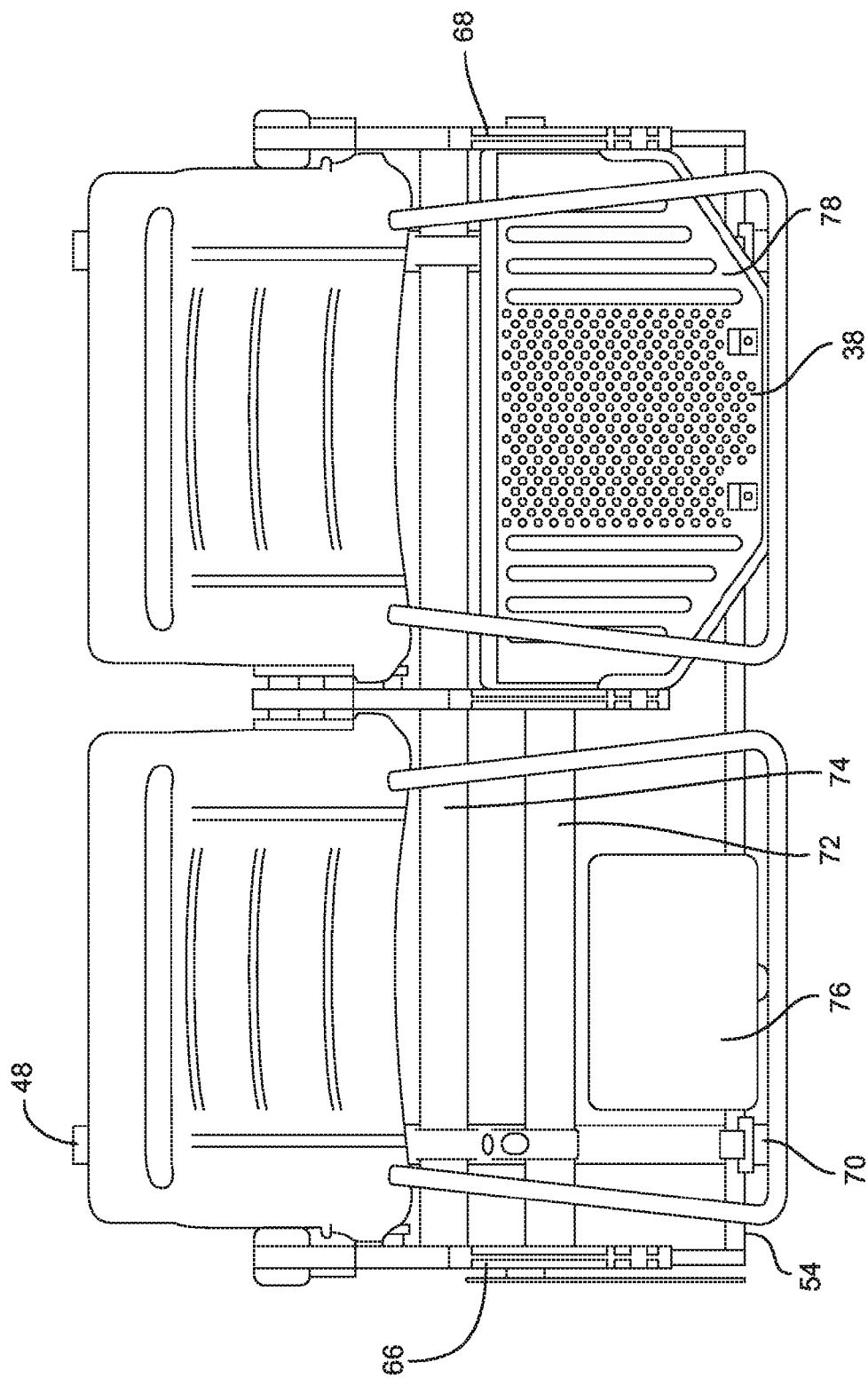
FIG. 5 is top view of laterally adjacent seat base frames according to the embodiment of FIG. 4.

Referring to FIGS. 4-5, a second embodiment of an aircraft passenger seat base frame is shown generally at reference numeral 60. The seat base frame 60 may also include a single seat, or two or more laterally adjacent seats collectively forming a row. Each seat within the same row generally includes a seat bottom 62 and seatback 64 cooperatively supported on and between spaced left and right spreaders 66, 68. The left and right spreaders 66, 68, positioned on opposite sides of the seat bottom 62, are supported above the floor by spaced left and right leg assemblies 70. The left and right spreaders 66, 68 and leg assemblies 70 are interconnected through front and rear transverse beams 72, 74, such as transverse beam tubes as shown.

The left and right spreaders 66, 68 and front and rear beams 72, 74 are the primary supportive frame members of the seat base frame 60. The front beam 72 according to the second embodiment is positioned vertically below the seat bottom 62 about halfway along the length thereof, while the rear beam 74 is positioned proximate the back end of the seat bottom and a vertical height above the front beam 72. In this arrangement, a space is provided forward of the rear beam 74 and vertically above the front beam 72 for locating the in-flight entertainment (IFE) components 38. This space dedicated for the IFE components 38 is protected from the top by the seat bottom 62, the back by the rear beam 74, and the bottom by the front beam 72. Again, the space is apart from and protected from passenger living space and under seat luggage storage.

The life vest container 76 is located vertically below the IFE components 38 at the forward end of the seat bottom 62, providing ready and convenient access thereto in the event of an emergency requiring use of a life vest. The life vest container 76 has a different configuration than above, and may open from the front to access the interior. The life vest container 76 may attach directly to the underside of the IFE components 38, or preferably to the underside of a shroud 78.

The left and right leg assemblies 70 each include a front leg 80 and a rear leg 82 configured to attach to an underlying seat track 48 in the floor by way of conventional track fasteners 50. The front leg 80 as shown extends forward at an angle to vertical, and particularly from below the front beam 72 to a position on the seat track 48 forward of the front beam. The rear leg 82 is curved and extends from vertically below the rear beam 74 to a position on the seat track 48 behind the rear beam. The space formed between the front and rear legs may be covered with a panel to divide footwells and/or prevent luggage stowed beneath the seat from moving into the aisle.

FIG. 5 shows laterally adjacent seats in the same row sharing frame components and the locations of the IFE components 38 and life vest container 76. A luggage retention bar 54 extends from a side of the seat base frame 60 and across the front the front legs 80 at a height elevated from the underlying floor to retain luggage stowed beneath the seat by an aft-seated passenger from sliding forward into the foot space of the seated passenger.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat base frame, comprising:
   spaced left and right spreaders supporting a seat bottom and a seatback;
   spaced front and rear transverse beams interconnecting the left and right spreaders, the front beam positioned proximate a forward end of the seat bottom and the rear beam positioned proximate a rear end of the seat bottom and at a vertical height lower than the front beam;
   an in-flight entertainment component positioned below the seat bottom in a space behind the front beam
   a shroud positioned underneath the in-flight entertainment component; and
   a life vest container positioned vertically below the front beam;
   wherein the rear beam is positioned directly beneath the in-flight entertainment component and beneath at least a portion of the shroud.

2. The aircraft passenger seat base frame of claim 1, further comprising spaced left and right leg assemblies each including a front leg and a rear leg adapted to be secured to a seat track by way of track fasteners.

3. The aircraft passenger seat base frame of claim 2, wherein the front leg of each of the left and right leg assemblies extends vertically between the front beam and the seat track, and the rear leg of each of the left and right leg assemblies extends from vertically below the front beam to a position on the seat track behind the rear beam.

4. The aircraft passenger seat base frame of claim 1, further comprising a luggage retention bar positioned vertically below the life vest container.

5. The aircraft passenger seat base frame of claim 1, further comprising a center spreader centered between the left and right spreaders, the center spreader shared by laterally adjacent passenger seats, and the front and rear transverse beams spanning between the left and right spreaders and through the center spreader.

6. The aircraft passenger seat base frame of claim 1, wherein the in-flight entertainment component includes one or more of video equipment, media equipment, internet equipment, communications equipment, audio equipment, cabling, and a wire harness.

7. An aircraft passenger seat base frame, comprising:
spaced left and right spreaders supporting a seat bottom and a seatback;
spaced front and rear transverse beams interconnecting the left and right spreaders, the front beam positioned proximate a middle of the seat bottom and the rear beam positioned proximate a rear end of the seat bottom and at a vertical height above the front beam;
an in-flight entertainment component positioned below the seat bottom in a space forward of the rear beam, wherein the front beam is positioned vertically below the in-flight entertainment component; and
a life vest container positioned forward of the front beam and vertically below the in-flight entertainment component.

8. The aircraft passenger seat base frame of claim 7, further comprising spaced left and right leg assemblies each including a front leg and a rear leg adapted to be secured to a seat track by way of track fasteners.

9. The aircraft passenger seat base frame of claim 8, wherein the front leg of each of the left and right leg assemblies extends at an angle to vertical from the front beam to a position on the seat track forward of the front beam, and the rear leg of each of the left and right leg assemblies curves from vertically below the rear beam to a position on the seat track behind the rear beam.

10. The aircraft passenger seat base frame of claim 7, further comprising a shroud positioned between the in-flight entertainment component and the life vest container, the life vest container secured to an underside of the shroud.

11. The aircraft passenger seat base frame of claim 7, further comprising a luggage retention bar positioned vertically below the life vest container.

12. The aircraft passenger seat base frame of claim 7, further comprising a center spreader centered between the left and right spreaders, the center spreader shared by laterally adjacent passenger seats, and the front and rear transverse beams spanning between the left and right spreaders.

13. The aircraft passenger seat base frame of claim 7, wherein the inflight entertainment component includes one or more of video equipment, media equipment, internet equipment, communications equipment, audio equipment, cabling, and a wire harness.

14. The aircraft passenger seat base frame of claim 1, wherein the rear beam abuts the shroud.

15. The aircraft passenger seat base frame of claim 1, wherein the shroud directly abuts the in-flight entertainment component.

\* \* \* \* \*